US012062007B2

(12) United States Patent
Conlon et al.

(10) Patent No.: US 12,062,007 B2
(45) Date of Patent: Aug. 13, 2024

(54) SYSTEM AND METHOD FOR AUTONOMOUS TRACKING AND REPORTING OF MISSED TRANSPORTATION AND/OR DELIVERY TIMELINES FOR TIME AND TEMPERATURE SENSITIVE SHIPMENTS

(71) Applicant: OVERHAUL GROUP, INC., Austin, TX (US)

(72) Inventors: Barry Conlon, Leander, TX (US); David Broe, Blackrock (IE); Andy Fletcher, Austin, TX (US); Amy Shortman, Cambridge (GB)

(73) Assignee: Overhaul Group, Inc., Austin, TX (US)

( * ) Notice: Subject to any disclaimer, the term of this patent is extended or adjusted under 35 U.S.C. 154(b) by 0 days.

(21) Appl. No.: 18/045,117

(22) Filed: Oct. 7, 2022

(65) Prior Publication Data

US 2023/0112300 A1    Apr. 13, 2023

Related U.S. Application Data

(60) Provisional application No. 63/253,181, filed on Oct. 7, 2021.

(51) Int. Cl.
*G06Q 10/0832*    (2023.01)
*G06Q 10/083*    (2023.01)
*G06Q 10/0833*    (2023.01)

(52) U.S. Cl.
CPC ..... *G06Q 10/0832* (2013.01); *G06Q 10/0833* (2013.01); *G06Q 10/0838* (2013.01)

(58) Field of Classification Search
CPC ....................................................... G06Q 10/08
See application file for complete search history.

(56) References Cited

U.S. PATENT DOCUMENTS 9,501,920 B2    11/2016 Harring et al.
10,755,225 B2    8/2020 Goodman et al.
(Continued)

OTHER PUBLICATIONS

Salah, Khalifa; "IoT-Enabled Shipping Container with Environmental Monitoring and Location Tracking"; 2020; IEEE 17th Annual Consumer Communications & Networking Conference (CCNC) (Year: 2020).*

(Continued)

*Primary Examiner* — Rupangini Singh
*Assistant Examiner* — David G. Godbold
(74) *Attorney, Agent, or Firm* — Isidore PLLC

(57) ABSTRACT

A method for facilitating on-time delivery of temperature and time sensitive (TTS) shipments. The method includes receiving, by a processor of a computing device, entry of TTS shipping data. The method includes receiving an entry providing an identification of a location tracker that is collocated with the TTS package, the location tracker enabling the TTS package to be geographically tracked during shipping. Method includes receiving a total time limit for package delivery from a current time, and assigning at least one threshold time that precedes the total time limit; receiving, via a network connection to the location tracker, an update of a real-time location of the TTS package relative to an intended destination; in response to the total elapsed time surpassing one threshold, generating and forwarding a notification to an output device that includes a pre-configured notification message related to the time and/or temperature sensitivity of the TTS package.

14 Claims, 11 Drawing Sheets

(56) References Cited

U.S. PATENT DOCUMENTS

| | | | | |
|---|---|---|---|---|
| 2009/0303052 | A1* | 12/2009 | Aklepi | G06Q 10/08 340/573.2 |
| 2016/0042318 | A1* | 2/2016 | Goodman | G06Q 10/08 705/330 |
| 2016/0110807 | A1 | 4/2016 | Downes | |
| 2018/0330321 | A1* | 11/2018 | Capelli | G06Q 10/08 |
| 2019/0250653 | A1 | 8/2019 | Conlon | |
| 2020/0134557 | A1 | 4/2020 | Pevzner et al. | |
| 2020/0167724 | A1 | 5/2020 | Klitenik et al. | |
| 2020/0226706 | A1* | 7/2020 | Ramarao | B60W 60/00256 |
| 2020/0342387 | A1* | 10/2020 | Rajkhowa | G08G 1/202 |
| 2020/0409645 | A1* | 12/2020 | Clark | G06F 1/3265 |
| 2021/0216962 | A1 | 7/2021 | Lawson et al. | |

OTHER PUBLICATIONS

Patent Cooperation Treaty (PCT) International Application No. PCT/US2022/046117, International Search Report and Written Opinion, Jan. 9, 2023.

* cited by examiner

CREATE NEW SHIPMENT ☒ Time & Temperature Sensitive (TTS) Good/Package   Selected portal auto quick

GENERAL SHIPMENT INFO

| Shipment Type ▼ | TCP Packaging ☐ | TTS Notification Type ▼ | Notification recipient ▼ |
| Driver info | Shipper info | Carrier Info/Ref. # | Tracking Ref. # |
| Packout Date [March 16th] ☐ | Packout Time [05:24 PM] | Packer Name [Gerry Jones] ☐ | |

COUNTDOWN TIMER SETTINGS

| TTS validated duration [24 h: 00m] | TTS threshold time [22 h: 00m] | TTS countdown 24h:00m | TTS Elapsed time 0h:00m |
| ▼ Advanced | TTS threshold time [%] [90] ▼ | | |

*FIG. 3A*

- TTS validated duration - The total time limit that user enters for the shipment from pack out to final delivery
- TTS threshold - A threshold time (actual time or percentage of total TTS validated duration) at which an alert is generated to alert driver or other registered party, prior to the TTS validated duration, so that corrective action can be taken to enable TTS packet delivery within the TTS validated duration timespan
- Pack out date - The date on which the shipment was packed
- Pack out Time - The time at which the shipment was packed
- Packer Name - The person who has completed the shipment packaging
- TTS Elapsed Time - The time that has elapsed since the TTS pack-out time
- TTS countdown - The time remaining to get the shipment delivered

*FIG. 3B*

SHIPPER COMPUTER TTS SHIPMENT MONITORING UI 400

| TTS SHIPMENT NAME/ID [TAG ID] | TTS TIME LIMIT | TTS THRESHOLD (T0, T1, T2) [%, TIME] | CURRENT TIME [%, TIME] | WARNING STATUS | NOTIFICATION | CORRECTIVE ACTION(S) |
|---|---|---|---|---|---|---|
| GOOD 1234 TCP – AB Refrigerated Good | 6 hrs - 7:15AM | 1 Hr before expiration, 6:15AM | 4:15AM, 1 hr before T0 | GREEN | Driver | Reduce Container Temp 2 degrees |
| GOOD 121 TCP - AC Perishable Good | 28 hrs – Tues 9:40AM | 26.5hrs - 7:00AM Tues | Time > T1 | YELLOW | Driver/Operator Recipient | Update Shelf Life |
| . | . | . | . | . | . | . |
| GOOD D TCP – BC Other TC Good | 16 hrs | [75%] 12 hrs & 14, 15Hrs | 15.5 Hrs | FLASHING RED | Driver/Operator, Shipper, Recipient, Ins. Co. | Transfer Package to REFER Truck |
| GOOD E NON-TCP PACKAGE | 3:45PM | 1:00, 2:30PM | 2:15PM | RED | Driver/Operator Shipper Recipient | Reduce Temp 2 °F; Adjust Humidity |
| GOOD F PACAKGE X OTHER VARIABLE | Wed 8:10AM | 6:30am | 6:15am | YELLOW | Driver/Operator Shipper Recipient | Reduce Humidity Level 5% |

FIG. 4

TTS Shipment Monitoring UI 500

| GENERAL INFORMATION | | | DEVICE DATA | |
|---|---|---|---|---|
| TTS Countdown | TTS Elapsed Time | TTS Validated Duration | | TTS Threshold |
| -22h:24m | 24h.44m | 02h:20m | | 002:00m |

◇ Markiviv – topoaubka, 74, ab8i8, Lviv, Ukraine ⓘ
  16th Mar/10:00 am EET

◇ Bober – b06pnlir, Kyiv, Ukraine ⓘ
  16th Mar/7:23 pm EET

◎ TTS validated duration exceeded

Lat 49.839 Lon 24.00731
Event Source: Auto
Device Generated: 03/15/21 7.43 pm EET
Event Generated: 03/15/21 7:43 pm EET
Iooroybno, 74 fbeia, Ivin, Ukraine

FIG. 5

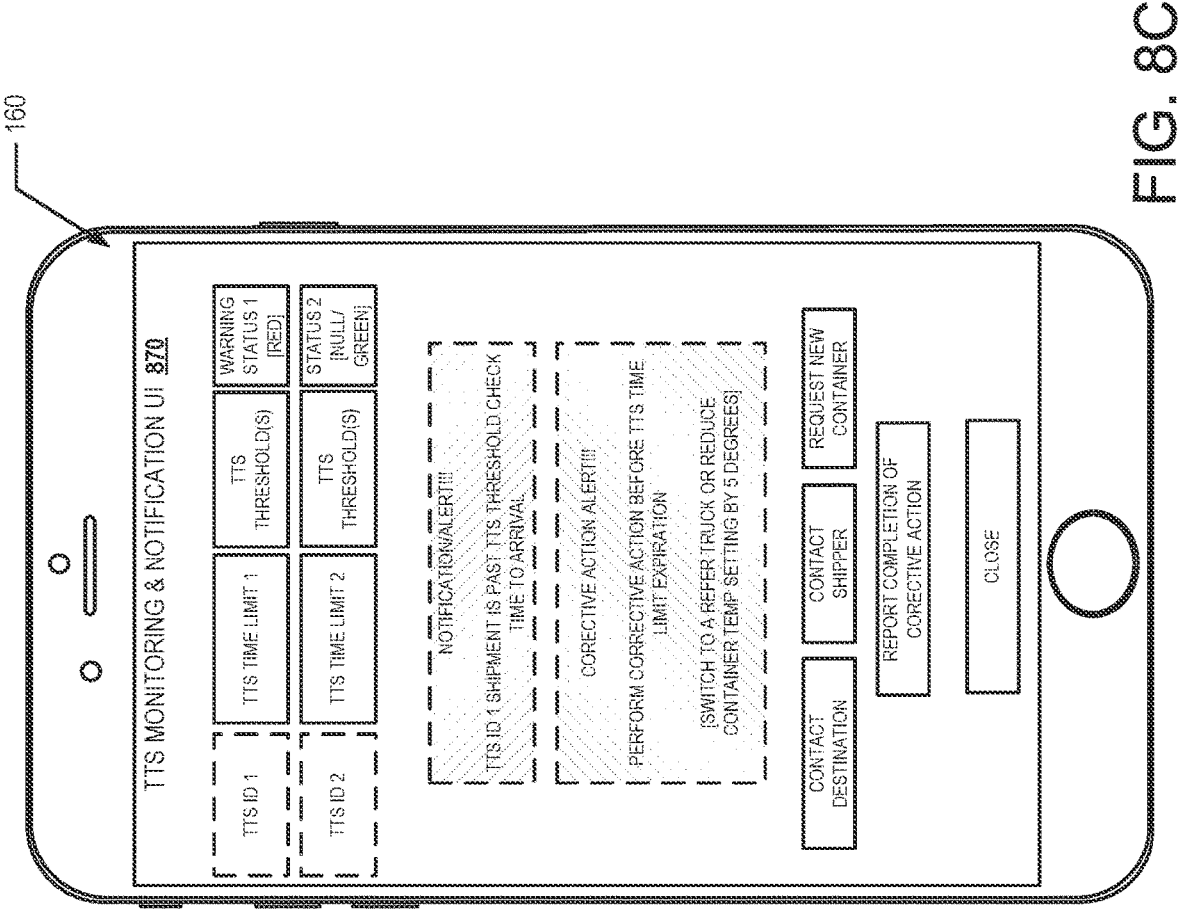
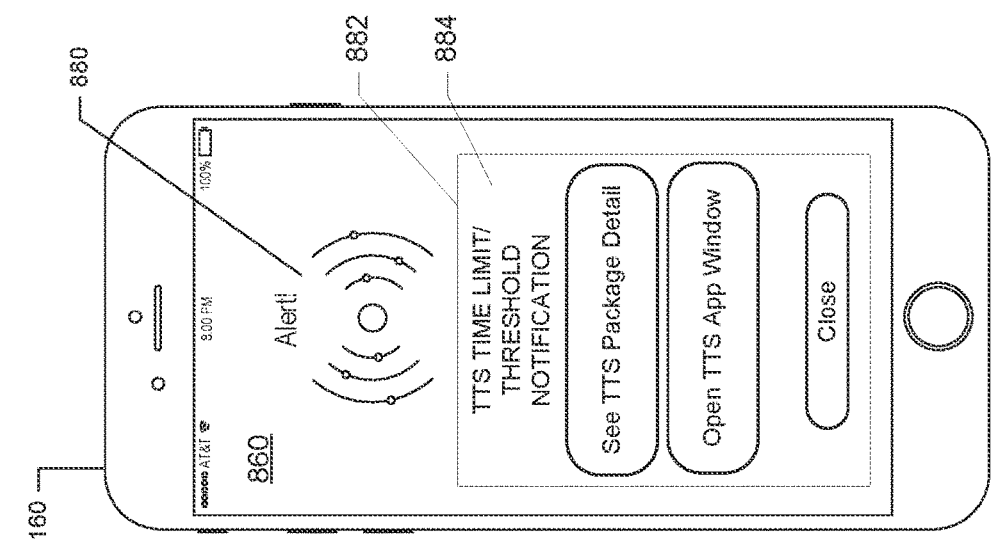
FIG. 8C
FIG. 8B

SYSTEM AND METHOD FOR AUTONOMOUS TRACKING AND REPORTING OF MISSED TRANSPORTATION AND/OR DELIVERY TIMELINES FOR TIME AND TEMPERATURE SENSITIVE SHIPMENTS

PRIORITY APPLICATION

This application claims priority to U.S. Provisional Application No. 63/253,181, filed Oct. 7, 2021, the content of which is fully incorporated by reference.

BACKGROUND OF THE INVENTION

1. Field of the Invention

The present disclosure is generally related to transportation of goods, and in particular to a method and system for monitoring the transportation of time and/or temperature sensitive goods.

2. Description of the Related Art

In the cargo shipping and transportation industry, certain goods/cargo have a limited time from the shipment date for the good/cargo to reach the end destination. For example, some goods are susceptible to deterioration or spoilage if not delivered within a certain time from the packaging facility to the end consumer or retail store. Additionally, the manner in which the goods are packaged and the vehicle or container in which the package is delivered can also affect the usable life of the good. Perishable goods, such as fruits, vegetables, fish, and meat products, tend to deteriorate more rapidly when not package and/or transported in a properly refrigerated container and/or when exposed to certain ambient conditions or to an environment that promotes quicker (more rapid) deterioration. To protect smaller quantities of certain goods that are temperature sensitive (e.g., goods requiring a specific range of temperature during shipping), temperature-controlled packaging (TCP) is often used to enable the goods remain in optimal conditions for a set period of time.

Even when a good has been placed in TCP, the TCP only provides the good with a set amount of time before the beneficial effects of the TCP is no longer able to protect the good from deterioration. These packaged goods thus have to be delivered to their intended end destination by/before the set amount of time after packaging has elapsed. Current shipping processes rely almost exclusively on the driver/operator of the transporting vehicle to move the shipment to the end destination on time. The current shipping processes provides no way of ensuring that the shipment does arrive on time.

Late delivery of the packaged good can result in a significant reduction in a "shelf life" of a consumable good or a time sensitive good. If the packaged good is delivered too late, the goods may be spoiled or rendered significantly less valuable, negatively affecting all parties with an interest in the good and its shipment/delivery, from the seller/supplier to the end recipient. The driver, operator, shipper and their respective insurance companies may also suffer financial losses for the late delivery, as well as loss of reputation or lowered rating for late delivery of the packaged good.

SUMMARY

A method, a distributed system, a computer device, and an operator mobile communication device (MCD) provide electronic tagging and monitoring of shipped packages, with predictive notification of delivery time limits and corrective actions, during shipment of time and temperature sensitive (TTS) shipping packages. According to one aspect, the method facilitates on-time delivery of a temperature and time sensitive (TTS) shipment. The method includes receiving, by a processor of a computing device, entry of TTS shipping data, including a selection for delivery time tracking of a TTS package. The method includes receiving an entry providing an identification of a location tracker that is collocated with the TTS package, the location tracker enabling the TTS package to be geographically tracked during shipping. The method includes receiving entry of a total time limit for package delivery from a current time. The method includes assigning, relative to the total time limit for delivery of the TTS package, at least one threshold time that precedes the total time limit and at which one or more notifications are presented to indicate that an elapsed time has exceeded a specific threshold of the at least one threshold time. The method includes automatically initiating a tracking of the elapsed time from a time of packaging an item within the TTS package. The method includes receiving, via a network connection to the location tracker, an update of a real-time location of the TTS package relative to an intended destination and comparing the elapsed time with at least one threshold time that precedes the total time limit. The method includes, in response to the total elapsed time surpassing a threshold time, generating and forwarding a notification to an output device that includes an indication of a current elapsed time relative to the total time limit and a pre-configured notification message related to the time and/or temperature sensitivity of the TTS package.

According to another aspect of the disclosure, the computer system includes a memory in which is stored at least one elapsed-time-tracking and notification (ETTN) application for time and temperature sensitive (TTS) shipments. The computer system includes at least one input/output device for receiving user input. The computer system includes a network interface device enabling the computer system to communicatively connect via one or more networks to a plurality of external devices, including a location tracking sensor and an operator mobile communication device (MCD). The computer system also includes a processor communicatively coupled to the memory and the network interface device and which processes program instructions of the ETTN application to configure the computer system to perform the above method functions.

According to yet another aspect of the disclosure, the mobile communication device (MCD) includes a memory having stored thereon a timed delivery tracking (TDT) mobile app (or generally TTS mobile app) for tracking remaining delivery time for a time and temperature sensitive (TTS) package being transported by an operator. The MCD includes input/output (I/O) devices comprising at least one input device and at least one output device, including a display screen. The MCD includes a wireless connection subsystem (WCS) that enables the MCD to wirelessly communicate with one or more second devices via one or more wireless networks. The MCD further includes a processor communicatively coupled to the memory and the WCS. The processor processes program code of the TDT mobile app to configure the MCD to: link, via the wireless connection subsystem, to a transmitter placed on a TTS package; and communicatively connect, via the wireless connection subsystem through a wireless network to a shipment tracking server, which provides a remote monitoring system that provides background tracking of different TTS shipments, including the TTS package. The processor further configures the MCD to receive a delivery time and at least one threshold time from the shipment tracking server related to the delivery of the TTS package, locally track an elapsed time and a remaining time for the TTS package being transported by the operator, and present, on the display screen, a user interface that tracks and reports, in real time, a time limit for delivery of the TTS package begin transported by the operator and the at least one threshold time. The processor further figures the MCD to, in response to an elapse time extending beyond the at least one threshold, provide an output to notify the operator of a missed threshold time within a timeframe for completing the delivery of the TTS package.

The above presents a general summary of several aspects of the disclosure in order to provide a basic understanding of at least some aspects of the disclosure. The above summary contains simplifications, generalizations and omissions of detail and is not intended as a comprehensive description of the claimed subject matter but, rather, is intended to provide a brief overview of some of the functionality associated therewith. The summary is not intended to delineate the scope of the claims, and the summary merely presents some concepts of the disclosure in a general form as a prelude to the more detailed description that follows. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 3A illustrates an example TTS shipment intake/setup user interface (UI) for inputting TTS shipment data and monitoring data at a shipper computer or packer mobile handheld device, in accordance with a plurality of embodiments;

FIG. 3B presents a table of descriptions that accompany the various inputs provided within the UI of FIG. 3A, in accordance with one or more embodiments;

FIG. 4 illustrates an example TTS shipment monitoring UI with a series of different TTS shipment types being monitored and tracked by one of a shipper computer and a SM server, in accordance with a plurality of embodiments;

FIG. 5 is a block diagram representation of a TTS shipment monitoring UI with at least one TTS shipment having an elapsed time that exceeds an established time threshold, according to one or more embodiments;

FIGS. 8A and 8B-8C present an internal component view and two user interfaces, respectively, of an operator mobile communication device (MCD), within which several of the described TTS shipment monitoring features can be implemented, according to a plurality of embodiments.

GENERAL OVERVIEW OF ILLUSTRATIVE EMBODIMENTS

Figure 1:
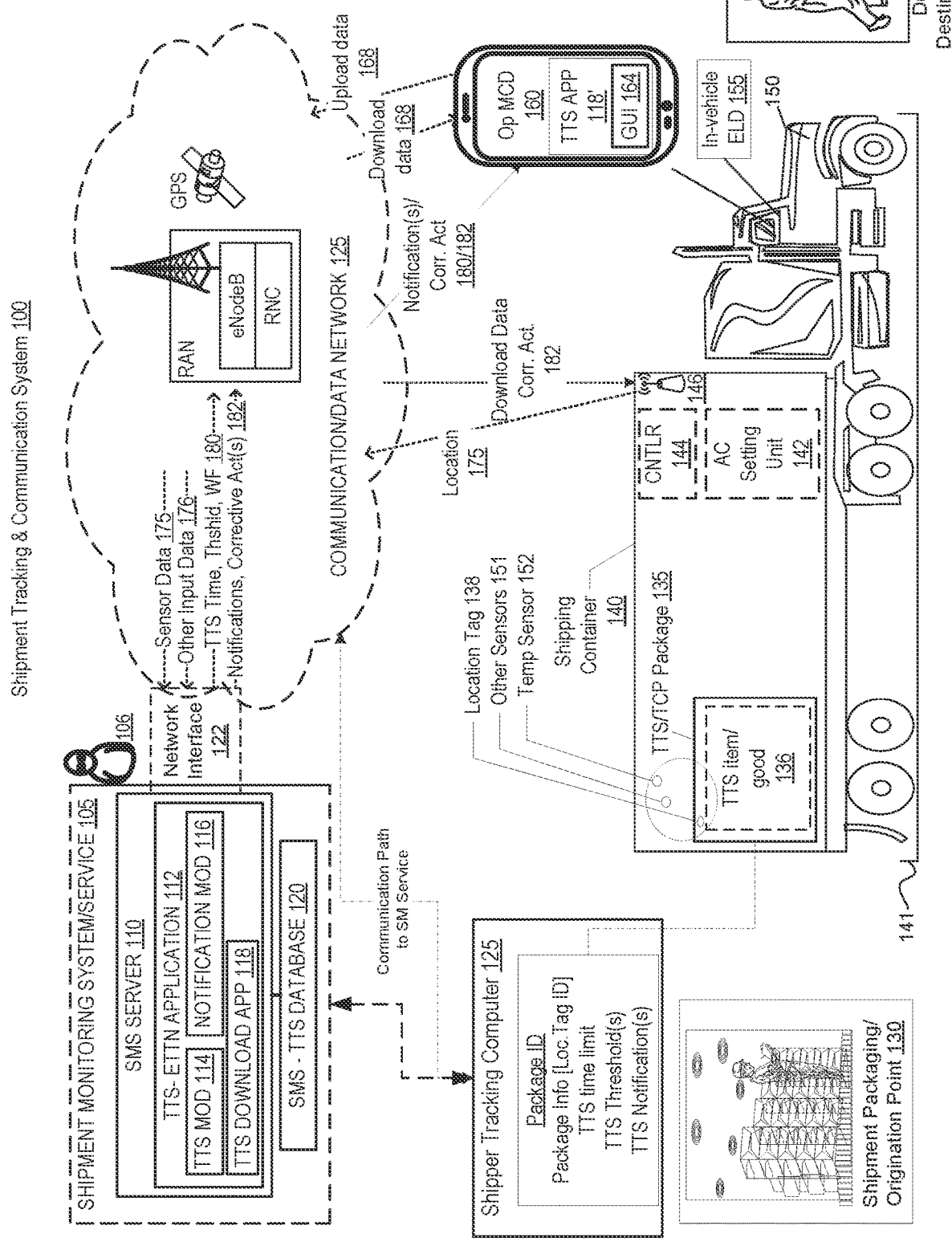
FIG. 1 illustrates an example shipment monitoring environment within which the monitoring and notification features for time and temperature sensitive (TTS) shipments can advantageously be implemented, according to one or more embodiments.

The illustrative embodiments of the present disclosure provide a method, a shipment tracking server or computer system, and an operator mobile communication device (MCD) provide electronic tagging and monitoring of shipped packages, with predictive notification of delivery time limits and corrective actions, during shipment of time and temperature sensitive (TTS) shipping of packages, such as temperature-controlled packaging (TCP) shipments. According to one aspect, the method facilitates on-time delivery of a temperature and time sensitive (TTS) shipment. The method includes receiving, by a processor of a computing device, entry of TTS shipping data, including a selection for delivery time tracking of a TTS package. The method includes receiving an entry providing an identification of a location tracker that is collocated with the TTS package, the location tracker enabling the TTS package to be geographically tracked during shipping. The method includes receiving entry of a total time limit for package delivery from a current time. The method includes assigning, relative to the total time limit for delivery of the TTS package, at least one threshold time that precedes the total time limit and at which one or more notifications are presented to indicate that an elapsed time has exceeded a specific threshold of the at least one threshold time. The method includes automatically initiating a tracking of the elapsed time from a time of packaging an item within the TTS package. The method includes receiving, via a network connection to the location tracker, an update of a real-time location of the TTS package relative to an intended destination and comparing the elapsed time with at least one threshold time that precedes the total time limit. The method includes, in response to the total elapsed time surpassing one threshold of the at least one threshold time, generating and forwarding a notification to an output device that includes an indication of a current elapsed time relative to the total time limit and a pre-configured notification message related to the time and/or temperature sensitivity of the TTS package.

According to another aspect of the disclosure, the computer system includes a memory in which is stored at least one elapsed-time-tracking and notification (ETTN) application for time and temperature sensitive (TTS) shipments. The computer system includes at least one input/output device for receiving user input. The computer system includes a network interface device enabling the computer system to communicatively connect via one or more networks to a plurality of external devices, including a location tracking sensor and an operator mobile communication device (MCD). The computer system also includes a processor communicatively coupled to the memory and the network interface device and which processes program instructions of the ETTN application to configure the computer system to perform the above method functions.

According to yet another aspect of the disclosure, the mobile communication device (MCD) includes a memory having stored thereon a timed delivery tracking (TDT) mobile app for tracking remaining delivery time for a time and temperature sensitive (TTS) package being transported by an operator. The MCD includes input/output (I/O) devices comprising at least one input device and at least one output device, including a display screen. The MCD includes a wireless connection subsystem that enables the MCD to wirelessly communicate with one or more second devices via one or more wireless networks. The MCD further includes a processor communicatively coupled to the memory and the wireless connection subsystem. The processor processes program code of the TDT mobile app to configure the MCD to: link, via the wireless connection subsystem, to a transmitter placed on a TTS package; communicatively connect, via the wireless connection subsystem through a wireless network to a shipment tracking server, which provides a remote monitoring system that provides background tracking of different TTS shipments, including the TTS package. The processor further configures the MCD to receive a delivery time and at least one threshold time from the shipment tracking server related to the delivery of the TTS package, locally track an elapsed time and a remaining time for the TTS package being transported by the operator, and present, on the display screen, a user interface that tracks and reports, in real time, a time limit for delivery of the TTS package begin transported by the operator and the at least one threshold time. The processor further figures the MCD to, in response to an elapse time extending beyond the at least one threshold, provide an output to notify the operator of a missed threshold time for completing the delivery of the TTS package.

As utilized herein, the term TTS generally refers to any transportable or storable goods that (i) have a specific optimal or maximum time to be shipped to an end destination after being packaged (i.e., made ready for shipment) and/or (ii) are required to ideally be stored and/or transported in a specific range of temperature to avoid excessive ripening, deterioration, spoilage, or other negative changes due to exposure to improper (and/or non-optimal) ambient conditions during shipment. It is appreciated that in some embodiments, the temperature sensitivity can also extend to a pressure sensitivity, a chemical sensitivity, and other sensitivities specific to the good, without limitation.

The disclosure recognizes and addresses a deficiency in the conventional shipping processes in which there is currently no process for alerting the driver, operator, shipper, or others interested in the TCP shipment when the elapsed time on the TCP shipment is approaching the expiration/threshold time at which the TCP benefits expire. The disclosure then implements the described processes to not only alert those interested parties but to also provide secondary notification of and access to services to assist with preventing spoilation of temperature sensitive goods and/or to enable the TCP shipment to arrive at its intended destination on time.

The attached figures present various aspects and/or features of the described embodiments, with certain features not expressly presented within the description herein. Within the different views of the figures, similar elements are provided similar names and reference numerals as those of the previous figure(s). It is understood that the use of specific component, device and/or parameter nomenclature is for example only and not meant to imply any limitations on the described embodiments. The embodiments may thus be described with different nomenclature and/or terminology utilized to describe the components, devices, parameters, methods and/or functions herein, without limitation. References to any specific name (which may or may not be proprietary) in describing one or more elements, features or concepts of the embodiments are provided solely as examples of one implementation, and such references do not limit the extension of the claimed embodiments to embodiments in which different element, feature, protocol, or other names are utilized. Thus, each term utilized herein is to be given its broadest interpretation given the context in which that term is utilized.

The description of the illustrative embodiments can therefore be read in conjunction with the accompanying figures. Those of ordinary skill in the art will appreciate that the basic configurations depicted in the figures may vary. The illustrative components are not intended to be exhaustive, but rather are representative to highlight essential components that are utilized to implement aspects of the described embodiments. For example, other devices/components/features may be used in addition to or in place of the ones depicted and/or described. The depicted examples are thus not meant to imply design, usage, or other limitations with respect to the presently described embodiments and/or the generally disclosure concepts.

With reference now to the figures, and beginning with FIG. 1, there is illustrated an example shipment monitoring environment within which the monitoring and notification features for time and temperature sensitive (TTS) shipments can advantageously be implemented, according to one or more embodiments. Shipment monitoring environment presents as a distributed shipment tracking and communication system 100 for use in monitoring conditions related to shipment of cargo within a shipment transport vessel 141, specifically a shipping container 140 being pulled by a tractor-trailer 150.

As shown by the figure and in accordance with one aspect of the disclosure, shipment tracking and communication system 100 (hereafter "system 100") is configured to establish workflows for TTS/TCP package deliveries, track elapse time of one or more TTS/TCP packages being transported within shipping container 140, and to respond to the elapse time surpassing one or more preset time thresholds by notifying one or more interested parties to the delivery time situation corresponding to the specific TTS/TCP package. TTS/TCP packages 135 contains one or more TTS item/good 136 that is required to be delivered to an intended destination 132 by a specific time after packaging (and/or in some embodiments, after leaving the shipment originating point 130). The system 100 includes a vehicle (generally transport vessel 140) for transporting the one or more TTS/TCP packages 135 from an origination point 130 to a delivery destination point 132. In the presented embodiment, the vehicle 141 also includes a truck/tractor-trailer 150 to which the shipping container 140 is attached. Located or embedded within the shipping container 140 are a plurality of sensors 151 which sense and records one or more parameter values of variables associated with an ambient condition, such as temperature, within the shipping container 140. The vehicle 141 has an assigned driver/operator 162 who has an operator mobile communication device (MCD) 160 with a TTS app 118 installed thereon. The TTS app configures the operator MCD 160 to present graphical user interfaces (GUOs) 164 specific to the work-flow of the TTS package 135 being transported within the vehicle 141. Other features and functionality of the TTS app 118 are provided within the more expansive description of the MCD 160 in FIGS. 8A-8B.

The system 100 also includes a remote shipment monitoring service/system (SMS) 105 having a SMS server 110 (i.e., a computer) that performs several of the monitoring and notification features described herein in communication with operator MCD 160 and other devices within the system 100. Shipment monitoring system 105 can also be interchangeably referred to as shipment monitoring service 105 and includes shipment monitoring personnel 106. The SMS server 110 is communicatively connected, via at least one communication/data network 125, to the plurality of sensors 151, 152 (via an intermediary transmitter 146) to enable transfer of information related to the parameter values and the ambient condition between the plurality of sensors 151, 152 and the SMS server 110. The SMS server 110 is also communicatively connected to shipper computer 125 and devices of other interested parties (not specifically shown) with an interest in monitoring or receiving shipment related data associated with one or more shipments. According to the one embodiment, SMS server 110 connects via a network interface 122 to communication and data network 125 to receive sensor data 175 and other input data 176 (e.g., data received from shipper computer 125 or Operator MCD 160) and to transmit TTS related data 180 (e.g., maximum delivery time, assigned/preset thresholds, workflow data) and notifications and corrective actions 182.

According to one embodiment, the SMS server 110 includes TTS elapsed-time-tracking and notification (ETTN) application 112, which includes TTS work-flow setup/configuration module 114, TTS Notification and response module 116, and a downloadable TTS App 118. It is appreciated that the downloadable TTS App 118 may be provided at a different App download location, such as made available for general mobile device app downloads. SMS server 110 also includes or is communicatively connected to SM-TTS Database 120 at which data related to the TTS packages and workflows are maintained/stored for access by SMS server 110.

Figure 2:
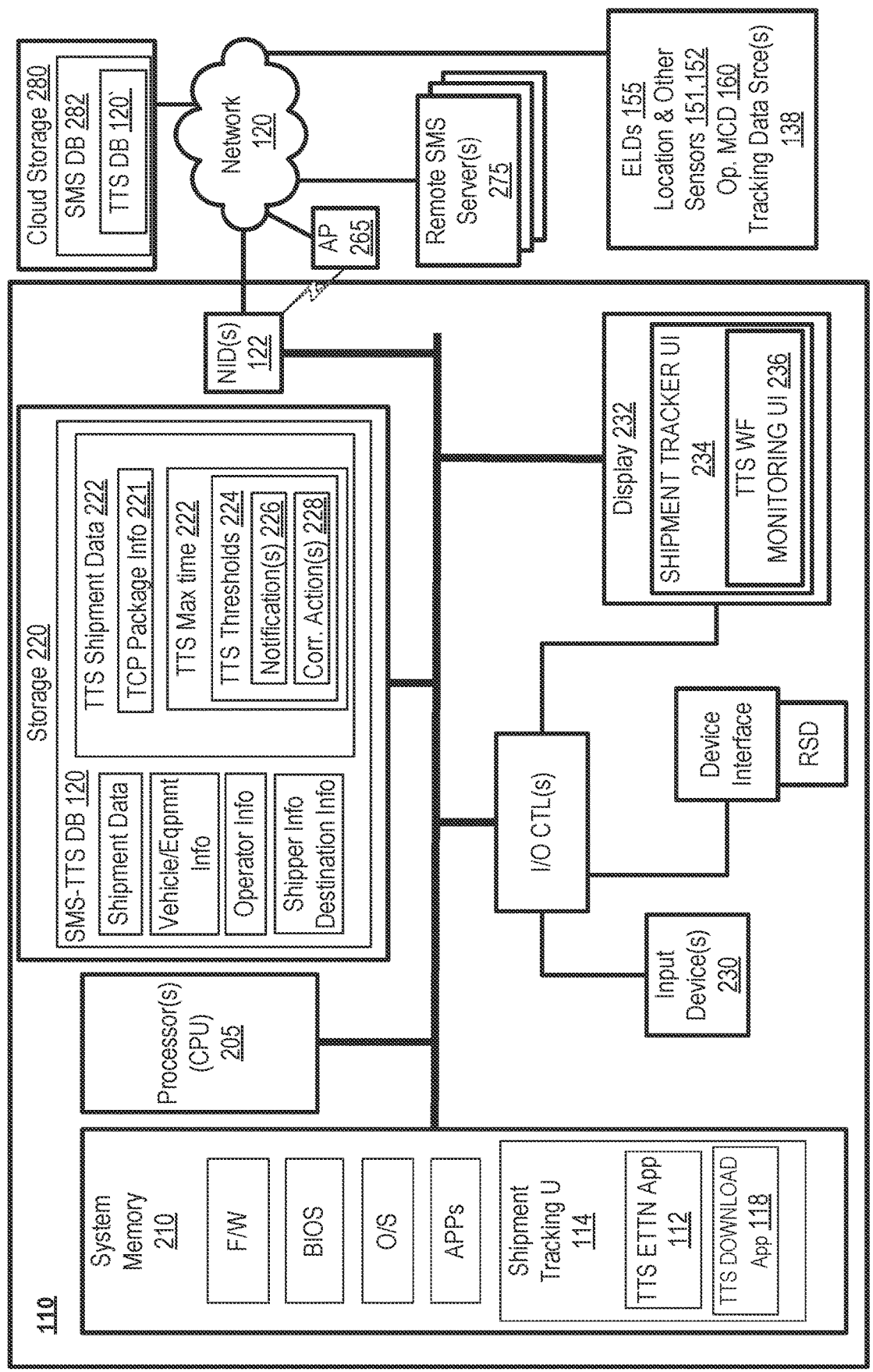
FIG. 2 is a block diagram illustrating components of an example data processing system that can serve as one of a shipment monitoring (SM) server or a shipper computer to provide background setup, monitoring, and notification features associated with TTS shipments, according to one or more embodiments.

FIG. 2 is a block diagram illustrating components of an example computer system (or data processing system) that can serve as one of SMS server 110 or a shipper computer 125 to provide background workflow setup, shipment monitoring, elapsed time tracking, and alert condition notification and corrective action features associated with TTS shipments, according to one or more embodiments. For simplicity, references to the general components of FIG. 2 and described as belonging to computer system are provided as being components of SMS server 110, although equally applicable to shipper computer 125. Generally, SMS server 110 includes processor(s) 205 coupled via system interconnect(s) to system memory 210, storage 220, and other components. System memory 210 stores a plurality of software and firmware modules, including the operating system and applications. Additionally, system memory 210 includes shipment tracking module or utility 114, which includes elapsed-time-tracking and notification (ETTN) application 112 for time and temperature sensitive (TTS) shipments. In the illustrative embodiment, system memory 210 also includes downloadable TTS app 118.

SMS server 110 also includes at least one input/output device 230 for receiving user input. SMS server 110 also includes network interface device(s) 122 enabling the computer system to communicatively connect via one or more networks 125 (with direct network connection or through network access points 265) to a plurality of external devices, including a location tracking sensor 138 and an operator mobile communication device (MCD) 160. SMS server 110 also includes a processor 205 that is communicatively coupled to the memory 210 and the network interface device 122 and which processes program instructions of the ETTN application 112 to configure the SMS server 110 to perform a series of functions related to the monitoring of the TTS shipment. As a user interfacing device, SMS server 110 includes a display 232 on which processor 205 presents a shipment monitoring/tracking user interface (UI) 234 that includes a TTS Workflow monitoring UI 236.

SMS Server 110 includes local storage 220 within which is maintained a local copy of SMS-TTS DB 120. As shown in FIG. 2, among the data that can be stored within SMS-TTS DB 120 are TTS package identifying data 322 and TCP package information 221 (e.g., type, length of storage time, etc.). Each TTS package includes associated data block including maximum available delivery time (TTS Max time) 222, preset threshold times 224, notifications 226, and corrective actions 228. Additionally, SMS-TTS DB 120 includes shipment data (e.g., description of the shipped goods) and information about the assigned shipping vessel, shipping vessel operator, and contact information of the parties to receive notifications about the shipment. Other data, such as alternate delivery routes, etc., can be determined and stored within SMS-TTS DB 120, without limitation. In one or more embodiments, TTS shipment/package data provides information about the cargo being transported, including a type of cargo, unique ID of the specific cargo, and optimal ambient condition settings and maximum delivery time for the particular cargo. In one or more embodiments, vehicle/equipment info provides details about the vehicle that can include the types of sensors available and communication information for the controller within the shipping container. Additionally, shipment data can include information about the destination of the shipment, route taken, length of time for transportation, and other information related to the shipment. A list of notification IDs can also be provided to include communication device network ID, such as an IP address or mobile device phone number, of each relevant party that is supposed to receive notification whenever the TTS threshold values are passed during shipping of the TTS shipment. The shipper and/or destination information can be specific information about the shipper and/or the end recipient.

SMS server 110 connects via network 125 to cloud storage 280, within which can be maintained a remote SMS DB 282 that includes remote SMS-TTS DB 120'. Network 125 also enables SMS server 110 to connect to other remote SMS servers 275 within a distributed server system and to other devices, including electronic logging devices 155, location and other sensors 151, 152, operator MCD 160, and secondary vehicle tracking data sources, collectively presented in a single box.

Processor 205 of SMS server 110 or shipper computer 125 processes the program code of the different TTS-associated program modules and utilizes the data within SMS-TTS DB 120 to configure the server 110 (or shipper computer 125) to perform a series of functions that are presented in part by the flow charts and within the appended method claims.

FIG. 3A illustrates an example TTS shipment intake/setup user interface (UI) 300 for inputting TTS shipment data, generally consisting of shipment data/selections 305 and countdown timer data/selections 310. Input and selections of these various data can be completed at/on a shipper computer or a packer's mobile handheld device, in accordance with different embodiments. FIG. 3B presents a table 320 of descriptions of the various inputs provided within the UI 300 of FIG. 3A, in accordance with one or more embodiments.

According to one embodiment, TTS shipment setup UI 300 of FIG. 3A is generated and presented on the display of the user device by processor execution of TTS-ETTN application 112. The timing and methodology for receiving these inputs can be different and can include, for example and without limitation, (i) The TTS data can be entered via a Shipment Manager App (e.g., TTS-ETTN app) before, during, or after the point of packing of the TTS shipment or TTS/TCP package, (ii) the TTS data can be entered when creating a shipment within Shipment Manager App, (iii) an existing shipment can be updated with the packing details after the goods have been packed, and (iv) TTS data is accepted via an integration with a shipper's monitoring system. According to one embodiment, creating and subsequent updating or editing of a shipment with TTS details within the shipment manager involves a series of activities, which can be performed in sequence. According to the example illustrated by FIG. 3A, the sequence of inputs can include: (i) add a shipment with TTS on shipment manager application; (ii) select a workflow that contains TTS validated duration and TTS threshold values, (iii) initiate a new countdown timer that contains all relevant TTS values; and optionally (iv) add the pack out date and time, plus the packer name. The validated duration & TTS threshold will default to values derived from the Workflow, and these values can be accepted by the shipper or modified. The TTS threshold values can be a direct time threshold (e.g., at 22 hours of elapsed time or, alternatively, with 2 hours remaining for a countdown timer) or can be a percentage elapsed (e.g., 90%) or percentage remaining (e.g., 10%) of the validated duration time.

According to one embodiment, creating a TTS shipment within a shipment manager app on a mobile device only requires the user enter the Packout Date and Time and the Packer Name. The TTS application then performs all the TTS calculations for the specific TTS shipment to generate additional TTS data. The user only has to enter the pack out time (optionally enter the TTS validated duration) and then select a workflow that has TTS values. The date and/or time is entered either during TTS shipment creation or TTS shipment updating. According to one aspect, the TTS countdown begins at the shipment pack out time, and the TTS countdown stops when the shipment is delivered.

FIG. 4 illustrates an example TTS shipment monitoring UI 400 with a series of different TTS shipment types being monitored and tracked by one of a shipper computer and a SM server, in accordance with a plurality of embodiments. Within UI 400 a top row of entries presents the example headings for the various data points that are provided in the UI 400. Among these example headings are TTS shipment name/ID, which can also be a tag ID where tags (RFID or other) are placed on the different shipment packages to uniquely identify the packages. The example headings further include TT time limit, TTS threshold, which can be an exact time or a percentage value of the full validated time duration, and current time. Headings also provide warning status, which can be a color-coded warning system, in one embodiment. As shown different colors represent a severity of the warning, where flashing red can indicate that the elapsed time (15.5 Hrs) is almost at the validated time duration (16 Hrs) for the TTS package delivery, which has not yet been completed. The next example heading provides notification recipient list to identify which person/persons are to receive notification when the elapsed time surpasses the TTS threshold for the TTS package. The final example heading presents a column with corrective action(s), which can be a specific action based on a plurality of factors, such as, but not limited to, the type of good, the type of packaging, the integrated capabilities of the shipping container, etc. As an example, when the shipping container is a reefer truck, and the TTS package is temperature sensitive (i.e., requires cooling), the corrective action can be reducing the ambient temperature within the truck by a set number of degrees.

FIG. 5 is a block diagram illustration of a TTS shipment monitoring UI 500 presenting details of a TTS shipment having an elapsed delivery time that exceeds an established time threshold, according to one or more embodiments. As shown, UI 500 provides that the TTS validated duration for delivery of the TTS package was 2 hours and 20 minutes, with a TTS threshold set for 2 hours. However, the elapsed time of 24 hours and 44 minutes is 22 hours and 20 minutes past the TTS validated duration (or 22 hours and 44 minutes past the TTS threshold. This data is presented to the user of the device and is also recorded and stored in the shipment tracking database. The TTS countdown value shows as a negative value because the delivery time has been exceeded. This data and/or the UI 500 may be presented with a unique color that informs a user of the failure to meet the TTS timeline for delivery of the TTS shipment.

Figure 6A:
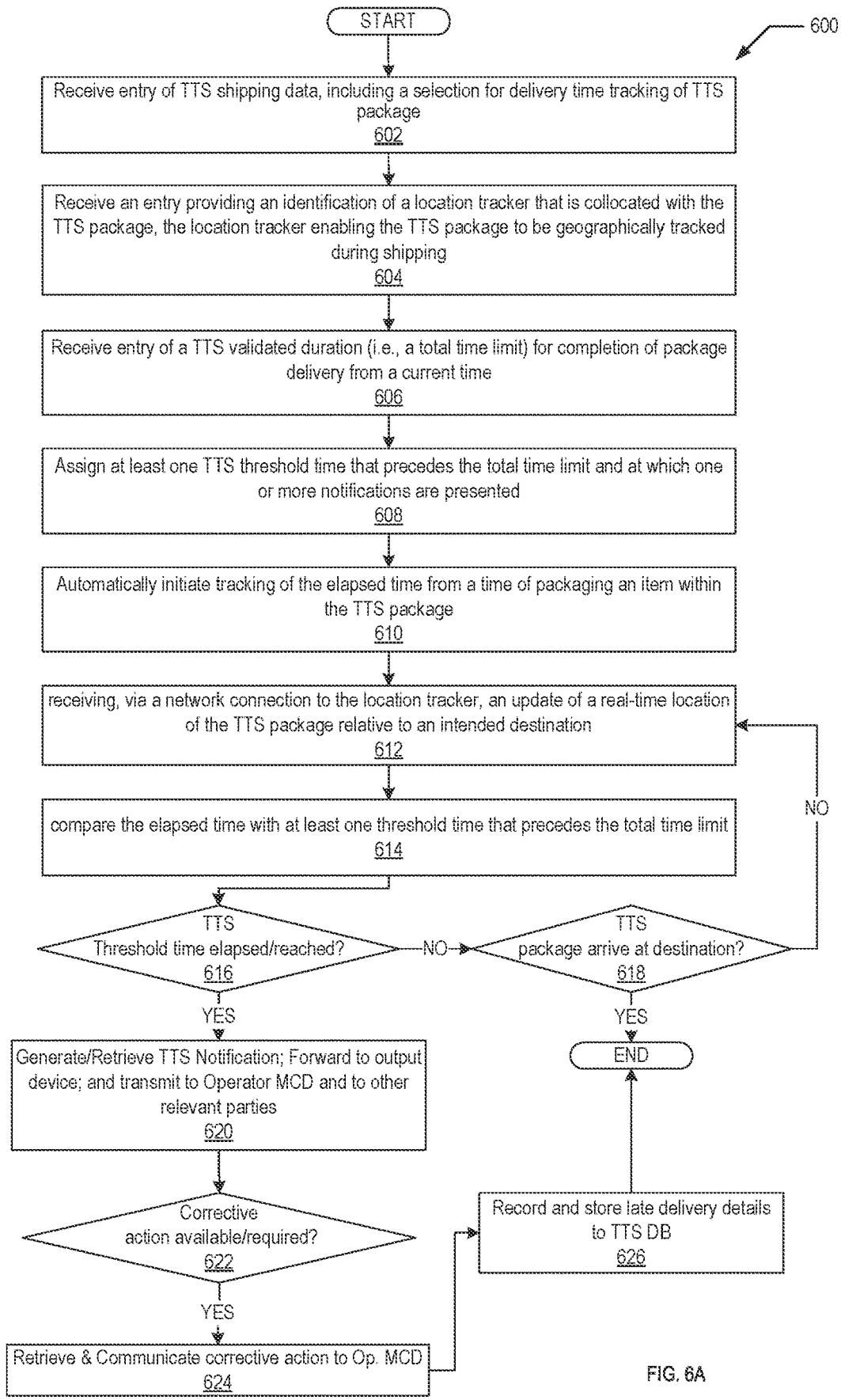
FIGS. 6A and 6B are flow charts of two methods by which TTS shipment workflow generation, TTS package monitoring, and notifications are completed by one or more computer devices, according to a plurality of embodiments.
Figure 6B:
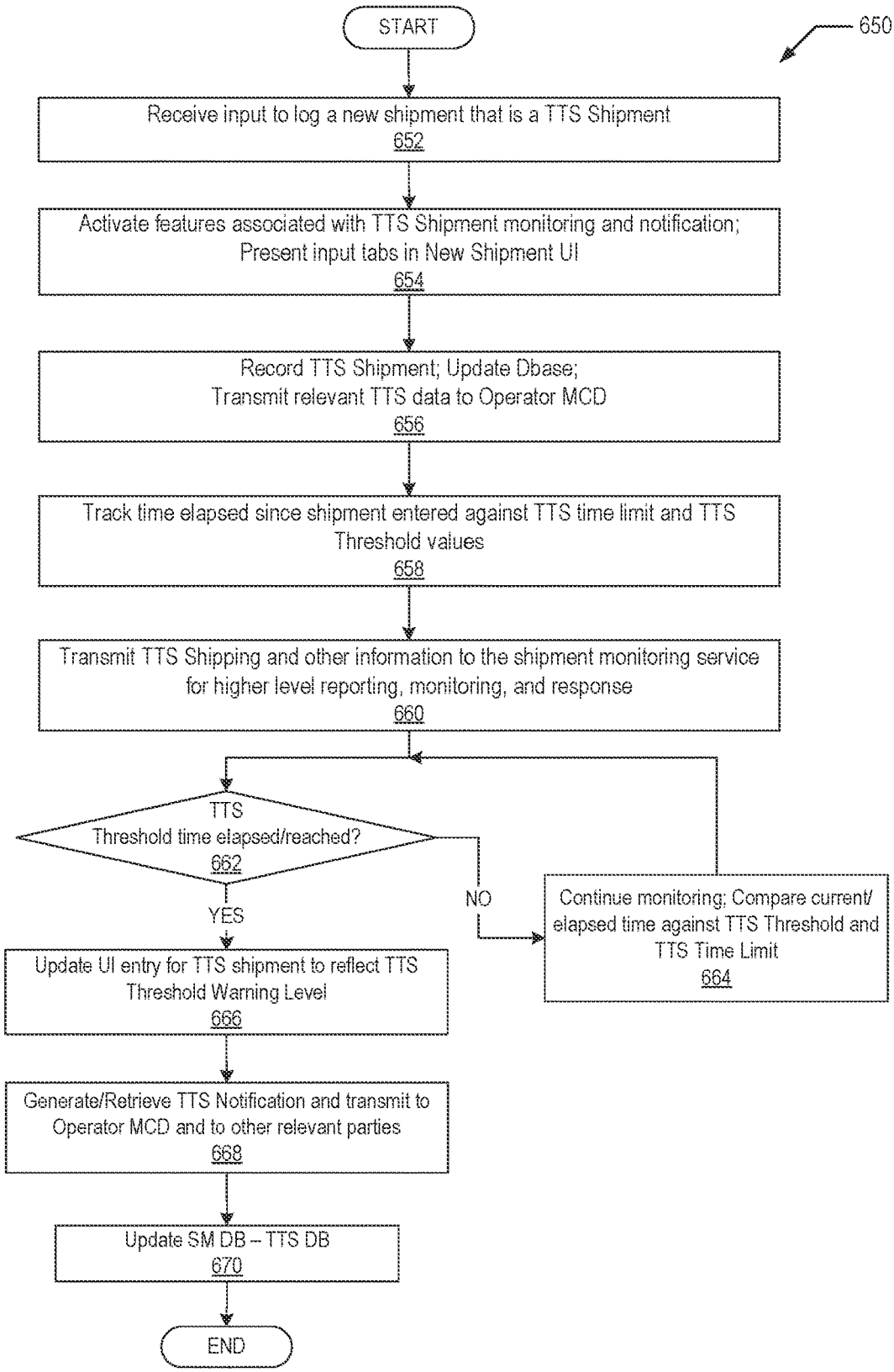
Figure 7:
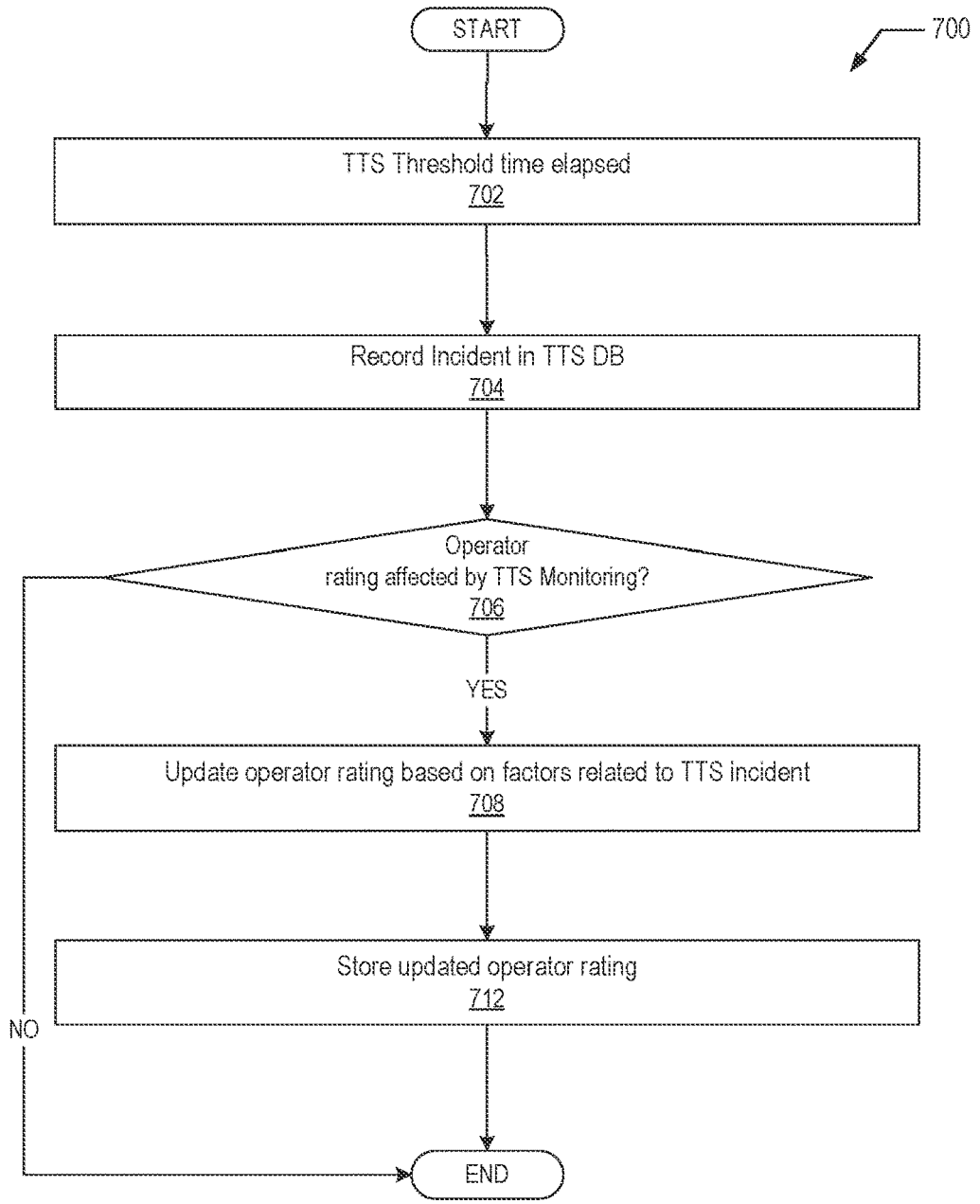
FIG. 7 is a flow chart of a method by which TTS shipment monitoring is utilized to update operator ratings within a shipment monitoring system, according to one or more embodiments.

FIGS. 6A-6B are flow charts of two methods by which TTS shipment workflow generation, TTS package monitoring, and notifications are completed by one or more computer devices, according to a plurality of embodiments. FIG. 7 is a flow chart of a method by which TTS shipment monitoring is utilized to update operator ratings within a shipment monitoring system, according to one or more embodiments. The descriptions of methods 600, 650, and 700 are provided with general reference to the specific components illustrated within the preceding FIGS. 1-5. In at least one embodiment, SMS server 110 or shipper computer 125, managed by processor 205, performs each of methods 600, 650, and 700 by executing program code of TTS ETTN application 116 (FIGS. 1 and 2) to provide the functions and features of method 600 and 700. Specific components described in methods 600, 650, and 700 can be identical or similar to specific components of the same name used to describe preceding FIGS. 1-5.

Referring now to FIG. 6A, commencing at the start block, method 600 includes receiving, by a processor of a computing device, entry of TTS shipping data, including a selection for delivery time tracking of a TTS package (block 602). The method 600 includes receiving an entry providing an identification of a location tracker that is collocated with the TTS package, the location tracker enabling the TTS package to be geographically tracked during shipping (block 604). The method 600 includes receiving entry of a TTS validated duration (i.e., a total time limit) for completion of package delivery from a current time, based on the particular item transported within the TTS package (block 606). The method 600 includes assigning, relative to the total time limit for delivery of the TTS package, at least one threshold time that precedes the total time limit and at which one or more notifications are presented to indicate that an elapsed time has exceeded a specific threshold of the at least one threshold time (block 608). The method 600 includes automatically initiating tracking of the elapsed time from a time of packaging an item within the TTS package (block 610). The method 600 includes receiving, via a network connection to the location tracker, an update of a real-time location of the TTS package relative to an intended destination (block 612) and comparing the elapsed time with at least one threshold time that precedes the total time limit (block 614). Method 600 includes determining at decision block 616 whether the elapsed time exceeds one of the at least one threshold time. If the elapsed time does not exceed the threshold time, method 600 includes determining at decision block 618 whether the TTS has arrived at its intended destination. If the TTS package has not arrived at the intended destination, method 600 loops back to block 612.

Returning to decision block 616, in response to the total elapsed time surpassing one threshold of the at least one threshold time, method 600 includes generating and forwarding a notification to an output device that includes an indication of a current elapsed time relative to the total time limit and a pre-configured notification message related to the time and/or temperature sensitivity of the TTS package (block 620). Method 600 further includes determining at decision block 622 whether there are any corrective actions available for mitigating the particular TTS package being delivered outside the TTS validated duration. If there are corrective actions available for overcoming the tardiness in delivery of the TTS packet, method 600 includes retrieving and communicating the corrective action to the operator MCD (block 624). Otherwise, method 600 proceeds to block 626, which provides recording and storing the tardy delivery details in the TTS DB (block 626). Then method 600 ends.

Turning now to FIG. 6B, method 650 presents a somewhat different implementation that method 600, with some overlaps in features. Method 650 includes receiving inputs to log a new shipment that is a TTS shipment (block 652). Method 650 includes activating features associated with TTS shipment monitoring and notification and presenting input tab within a new shipment UI (block 654). Method 650 includes creating a record of the TTS shipment, updating the TTS DB, and transmitting relevant TTS data to the MCD of the assigned operator (block 656). Method 650 includes tracking an elapsed time since the shipment package was generated (or the shipment was entered) against the TTS time limit and TTS threshold values (block 658). Method 650 includes transmit TTS shipping and other information to the shipment monitoring service for higher level reporting, monitoring and response (block 660). Method 650 includes determining at decision block 662 whether an established TTS Threshold time has been elapsed/reached. Method 650 includes, in response to the threshold time not elapsing, continuing to monitor the elapsed time and compare against the threshold times and TT time limit (block 664). Method 650 includes, in response to the TTS threshold time being elapsed, autonomously updating the UI entry for the TTS shipment to reflect a TTS threshold breach warning (block 666). Method 650 includes generating or retrieving a notification and transmitting the notification to the operator MCD and to other relevant parties (block 668). Method then includes updating the SM-TTS DB (block 670). Method then ends.

According to one or more aspect of the disclosure, a method is provided for ensuring on-time delivery of a TTS shipment, which is interchangeably described as a TTS package and/or a TCP shipment within the description. The method includes receiving, by a processor of a computing device, entry of a TTS shipment/package data, including an identification of a specific item/good being shipped, distinctive characteristics of the item/good, and a type of packaging provided for the item/good. The TTS package is provided with a localized location tracker that enables the TTS package to be geographically tracked. The method includes receiving an entry of a time limit for package delivery. The method can include optionally receiving entry of one or more temperature and other ambient sensitivities of the item. The method can also include receiving a selection of a level of "time to delivery" tracking desired for the TTS package. According to one embodiment, receiving the user input of the level of tracking desired can include receiving at least one second entry indicating at least one threshold time that is less than the time limit or dynamically determined as a time remaining percentage that is less than 100 percent. The at least one threshold time each corresponds to a type or severity of a notification to be outputted at a corresponding time during the shipment. In one embodiment, the time remaining percentage can also include 100% or higher percent corresponding to the shipment time exceeding the package delivery time limit. In one automated embodiment, the processor dynamically determines values of the at least one threshold time based on stored historical data, pre-programmed algorithm from an empirical evaluation of similar items and packages as the TTS package.

According to one aspect, the tracking of the TTS package can include certain additional enhancement features for a shipment tracking system. Accordingly, the method includes presenting a TTS shipment identifier on a shipment tracking UI that presents a graphical representation of movement of one or more shipments within a geographical area. The method also includes presenting shipment specific details associated with the TTS package, including the time limit and one or more threshold times, in response to detection of a selection of the shipment identifier in the shipment tracking UI. The shipment identifier can be an object, a point, or a text entry, and the graphical representation can be one, or a combination, of (i) a table listing of ongoing shipments, (ii) a geographical map with positional location and identification of each of the ongoing shipments, and (iii) a database of completed and ongoing shipments, etc.

According to one embodiment, the Shipment Monitoring (SM) Service provides current transit times, total expected transit times, and the length of time left before a TTS threshold will be passed. The method includes the processor dynamically generating a work-flow for the shipment and outputting a time remaining notification to shipment tracking user interface (UI) presented on an output device. The method includes the processor transmitting the time remaining notification, along with identifying characteristics of TTS package, including the item and/or type of packaging, to an operator mobile communication device (MCD). The operator can be a driver, pilot of a sea or air vessel, dispatcher of a trucking fleet or delivery service, etal., whose MCD is registered with the shipping company that is providing tracking of the TTS package being transported within a distributed shipping environment. The method includes the processor periodically updating a remaining time to delivery based on the received time limit and elapsed time from an initial start time. The method includes the processor outputting within the UI and transmitting to the operator MCD the updated remaining time for passive reference by the operator.

The method includes the processor determining that a current time is a threshold time corresponding to the at least one second entry. The method then incudes the processor generating a notification indicating that the delivery time of the TTS package is over the threshold time. The notification may be a visible change to the display of the UI, a highlighting one the UI of a specific tracking item associated with the TTS package, a blinking or color change of a notification icon associated with the TTS package, an auditory notification, generation of text with information about the specific notification, etal.

According to one aspect, the method includes transmitting, to the operator MCD, a notification signal that triggers a local app of the operator MCD to output an indication or warning to the operator that the TTS package has reached the threshold time. According to one or more embodiments, the notification can be transmitted to and received by the operator MCD as one of an email or an SMS text message. In another embodiment, based on receipt of the notification signal, the TTS shipping app on the operator MCD can also trigger the operator MCD to activate/wake-up (if MCD is in a sleep or low power mode) and present a local notification that the operator will receive. The local notification can be one of an audible, visual, haptic (vibrations), or textual notification. According to one embodiment, the notification can also include additional information provided to the operator to have the operator take corrective actions (i.e., specific required steps) to further protect, or to extend the shipping time of, the TTS package. As one example, for a temperature sensitive shipment, where the packaging can only provide the required level of cooling for the item/good for a pre-set number of hours corresponding to the time limit, the operator may receive information requesting the operator transfer the package to a refrigerated truck or place the package in an ice-chest, etc. Thus, the TTS monitoring functionality allows a shipper to manage the corrective action(s) required to ensure that the shipper's quality risk management is safeguarded and enables logistics operations to have critical insights into the TTS shipments.

According to one aspect, method also includes categorizing risks among different levels. The risk levels (e.g., high, medium, low) can be directly correlated with one or more of which time threshold is passed, a type of item being shipped, an amount of time left before exceeding the time limit, as well as the sensitivity of the specific item being shipped to being delivered within or before the time limit. The method includes automatically changing a location or visual representation of the shipment identifier relative to other shipments based on a current risk level of the TTS package, with respect to delivery within the time limit, being elevated relative to the other shipments. For example, higher risk shipments can be moved to the top of a table listing the different shipments, with the lower risk shipments towards the bottom of the table. The table can also be sequenced according to the delivery time, such that a shipment having only a short time remaining for delivery is also placed towards the top of the table.

In one embodiment, multiple different threshold times are provided for a single TTS package. The method includes monitoring each time a threshold time is missed or passed and aggregating these as TTS events that occur with the single shipment and/or with a single operator. The method includes generating different responses based on the aggregated number of thresholds that may have been passed or missed for the single shipment. Method can also include tracking and recording a length of time a TTS package is placed in an elevated/high level status and generating specific responses and communicating specific corrective actions based on that length of time.

According to one or more embodiments, different levels of notification may be provided based on the severity of the situation (e.g., which time threshold has been passed and the potential damage to the shipment, based on the type of shipment if not timely delivered). The severity may also correlate directly to an amount of time remaining before the shipping time limit expires. Thus, the method includes identifying which of a plurality of pre-set threshold times are reached and generating a corresponding level (or severity) of notification based on the current threshold time that has been reached.

In response to expiration of the time limit before the TTS package is delivered to its intended end destination, the method includes recording the expiration within a shipment tracking database, recording any provided or determined weather, traffic, or other received conditions that affected the timing of the delivery of the TTS package. According to one embodiment, the method further includes updating a rating of the operator based on one or more factors derived from compliance with the time limits.

The method also includes notifying each interested party to the TTS package of the late delivery of the shipment, including any provided insurer of the shipment or receiving end consumer or retailer. As one example, the shelf life of the item can be adjusted when the TTS package containing the item arrives outside of the TTS time limit. The retailer and/or end consumer can be notified that the shelf life has been reduced due to delays in the shipping/transportation, as determined by the number of infractions and durations of those infractions (e.g., tardiness) of the shipment during the transportation thereof, and where relevant, any associated ambient conditions that can become a factor based on the extended shipment time or tardiness of the shipment.

According to a related aspect, the selection of a specific operator (i.e., carrier/driver/equipment) can be based on an operator ranking/profile, in part determined by considering the number of thresholds missed or passes when transporting one or more shipments. The ranking can involve a historical tracking of the success rate of the operator with getting TTS packages to their intended destination within the preset time limit. during the transportation of the shipment. This historical tracking can then be utilized to generate a graph, pictograph, pictogram, or other presentation of the data or summary thereof that can be used in evaluating correlations between different products being shipped from a particular source to one or more destinations by different carriers/drivers.

Referring now to FIG. 7, method 700 includes identifying that the TTS threshold time has been elapsed before delivery of the TTS package is completed (block 702). Method 700 includes recording the incident within the TTS DB (block 704). Method 700 includes determining at decision block 706 if the operator rating is affected by TTS monitoring. In response to the operator rating being affected, method 700 includes updating the operator rating within the DB, based on the factors related to the TTS tardy delivery incident (block 708). Method 700 includes storing the updated operator rating (block 712). Method 700 then ends.

Figure 8A:
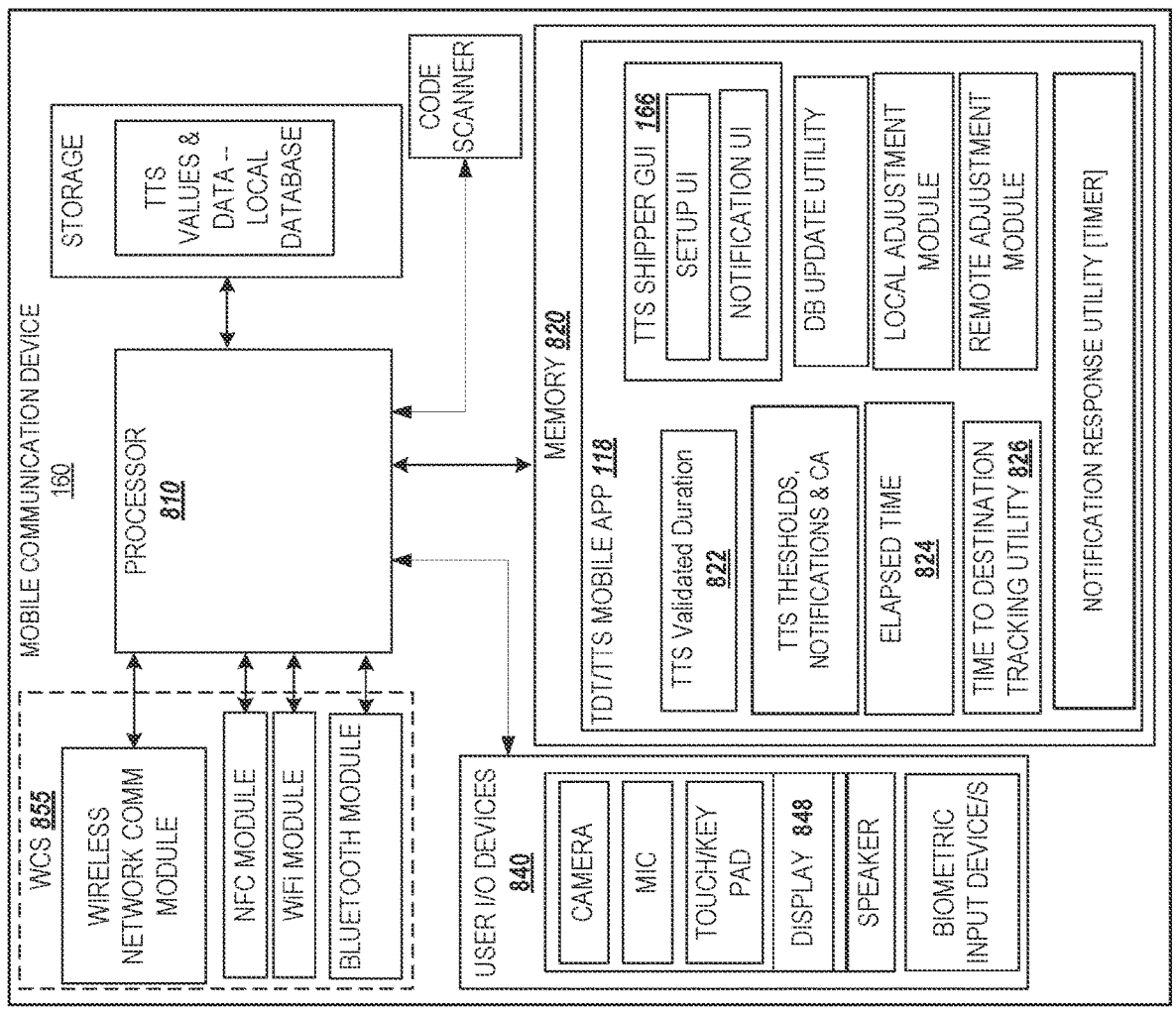

FIGS. 8A and 8B-8C present an example of memory components and examples of user interfaces of an operator mobile communication device (MCD), within which several of the described TTS shipment monitoring features can be implemented, according to a plurality of embodiments. MCD 160 includes standard hardware features of a mobile smart phone or similar devices that are designed for communication via a wireless network using over-the-air-signal communication. As a device supporting the features of the disclosure, MCD also includes a memory having TTS shipment data, a local copy of TTS ETTN App downloaded from a server or other resource, an internal time clock for monitoring elapsed time, etal. It is appreciated that MCD 160 may have specific hardware components that provide similar functions as those described above for shipper computer 125 and SMS server 110 (FIG. 2) but configured for the smaller form factor of MCD 160. Those of skill in the art appreciate that the component makeup of MCD 160 will enable MCD 160 to perform the specific features described herein. Thus, only the primary components of MCD are described within the illustration of FIG. 8A.

According to one aspect of the disclosure, the mobile communication device (MCD) 160 includes a memory 800 having stored thereon a timed delivery tracking (TDT) mobile app (or generally TTS mobile app) 118 for tracking remaining delivery time for a time and temperature sensitive (TTS) package being transported by an operator. The MCD 160 includes input/output (I/O) devices 840 comprising at least one input device and at least one output device, including a display screen 848. The MCD 160 includes a wireless connection subsystem (WCS) 855 that enables the MCD to wirelessly communicate with one or more second devices via one or more wireless networks (125, FIG. 1). The MCD further includes a processor 810 communicatively coupled to the memory 820 and the WCS 855. The processor 810 processes program code of the TDT mobile app 118 to configure the MCD to: link, via the wireless connection subsystem 855, to a transmitter 138 (FIG. 1) placed on a TTS package; and communicatively connect, via the wireless connection subsystem 855 through a wireless network to a shipment tracking server (SMS server 110), which provides a remote monitoring system that provides background tracking of different TTS shipments, including the TTS package. The processor further configures the MCD to receive a delivery time (TTS validated duration 822) and at least one threshold time from the shipment tracking server related to the delivery of the TTS package, locally track an elapsed time 824 and a remaining time 826 for the TTS package being transported by the operator, and present, on the display screen 848, a user interface 166 that tracks and reports, in real time, a time limit for delivery of the TTS package begin transported by the operator and the at least one threshold time. The processor further figures the MCD to, in response to an elapse time extending beyond the at least one threshold, provide an output (via one or more of the output devices) to notify the operator of a missed threshold time within a timeframe for completing the delivery of the TTS package.

Referring now to FIG. 8B, there is illustrated a notification GUI 850 presented on display screen 848 of operator MCD 160. In FIG. 8B, the background app detects that the elapsed time has exceeded one of the set thresholds for the TTS shipment being tracked by the MCD 160, and the processor 810 of the MCD 160 responds by generating and outputting an alert 880 that can be audible (through device speakers) and/or visible in the form of text box 882 with specific text messaging 884 indicating the stated condition. The text box 882 may include additional selectable buttons or options for activating other features in response to the notification. In one embodiment, one of the buttons or options triggers opening of additional GUIs with other features such as a list of corrective actions that can be followed for the particular failure of the operator or pending failure to complete the delivery of the TTS packaged by or before ethe preset maximum delivery time (TTS validated duration).

FIG. 8C illustrates an example TTS mobile App GUI 870 presented on display 848 of operator MCD 160. TTS mobile App GUI 870 provides a listing of two TTS shipments/packages being transported by operator. Each TTS shipment is presented along with its corresponding TTS shipment ID, TTS time limit, TTS Thresholds, and current warning/notification status. In the illustrative example, the first package has a Red warning status for an elapsed time since packaging being more than an established threshold for delivery of that package. TTS mobile App GUI 870 presents a series of notifications/alerts specific to this warning status of the first TTS package. TTS mobile App GUI 870 also provides a corrective action alert what includes instructions to transfer the TTS package to a reefer truck and/or reduce the container temperature by 5 degrees. As shown, TTS mobile App GUI 870 also includes selectable options to contact different interested parties, including an option to require a new container for the TTS package. Finally, the operator is able to report completion of the corrective action within the TTS mobile App GUI 870, and then close the TTS mobile App GUI 870.

Figure 9:
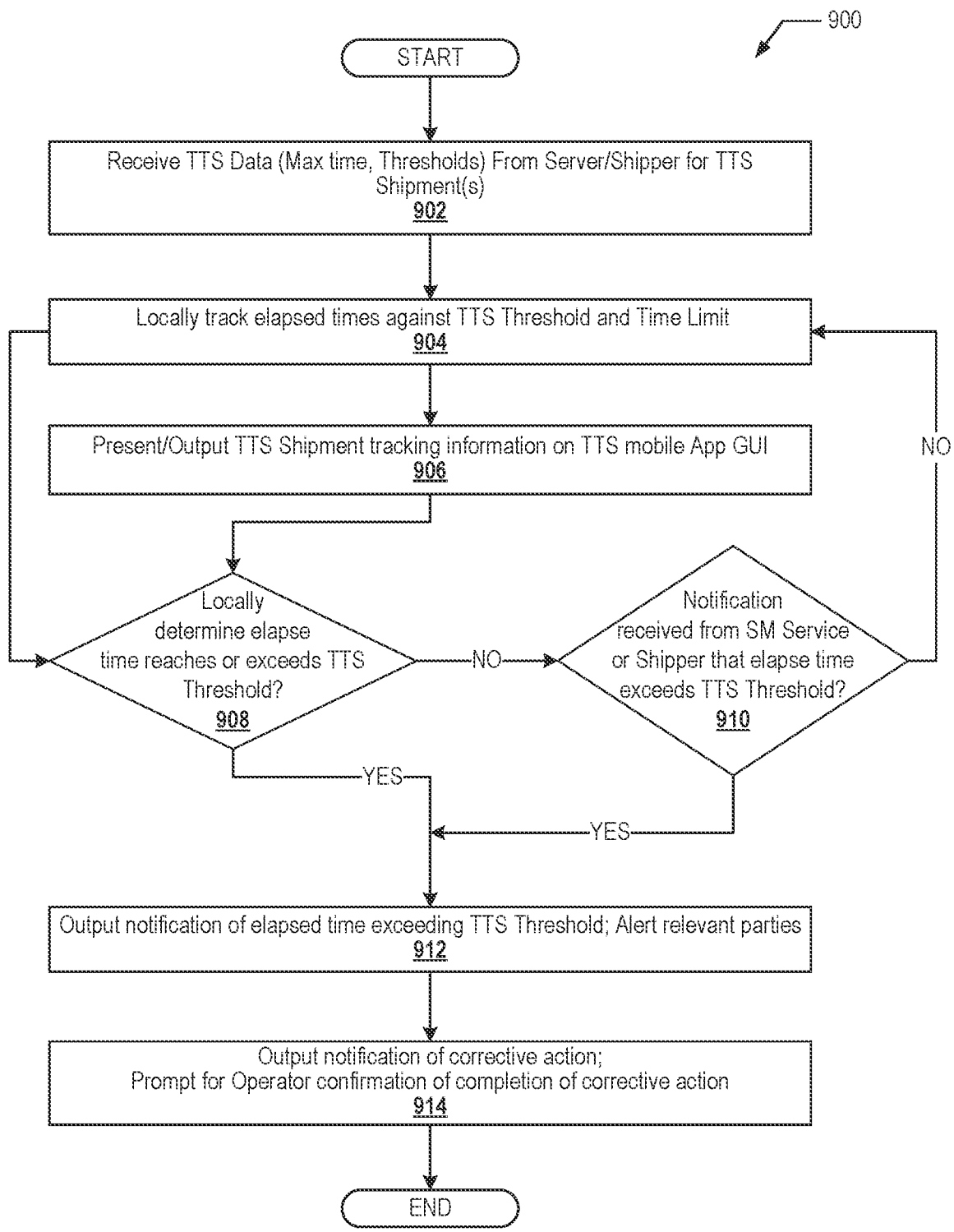
FIG. 9 is a flow chart of a method for completing TTS shipment monitoring via an operator MCD, according to one or more embodiments.

FIG. 9 is a flow chart of a method 900 for completing TTS shipment monitoring via an operator MCD, according to one or more embodiments. Method 900 is performed by processing of program code of TTS mobile App 118 by processor 810 of MCD 160. Method 900 includes receiving TTS data from the shipper computer and/or SMS server for one or more TTS shipments (block 902). It is appreciated that, in at least one alternate embodiment, the TTS data can also be manually entered into the GUI of the local TTS application executing on MCD 160. Method 900 includes locally tracking elapse times associated with each TTS shipment against the corresponding TTS threshold(s) and maximum time limit provided for each TTS package/shipment (block 904). Method 900 includes presenting/outputting the TTS shipment tracking information on the TTS mobile app GUI (block 906). Method 900 includes determining at decision block 908, if the elapsed time is at or exceeds the TTS threshold. In response to the local determination not indicating that the elapsed time reaches or exceeds the TTS threshold, method further includes determining at decision block 910 if a notification is received from the shipper computer 125 or SMS server 110 indicating that the elapsed time exceed the TTS threshold. It is appreciated that this second external check my be ongoing even when the local device is tasked with performing the check locally in order to provide redundancy in the system to prevent a user's device from running failing or loosing accurate track of the TTS thresholds and/or elapse times. If no notification is received from the external computer devices, method 900 returns to block 904. However, if the device locally determines that the elapsed time reaches or exceeds the TTS threshold at decision block 908 or receives a notification of this status from the external computer devices, method 900 includes outputting a notification of the elapsed time exceeding the TTS threshold and generating and transmitting an alert of the status to relevant parties (block 912). Method 900 then includes outputting a notification or information about possible corrective actions that can be taken and prompting the operator to provide confirmation of completion of the corrective action (block 914). Method 900 then ends.

According to one aspect, an operator mobile communication device (MCD) is configured with a TTS package time delivery tracking (TDT) mobile app. The TDT mobile app presents a user interface that tracks and reports, in real time, the time limit for delivery of the specific TTS package begin transported. The operator MCD and the transmitter placed on the package are communicatively linked via a wireless network to the shipment tracking server, which is a remote monitoring center/server that provides background tracking of the different TTS shipments and other shipments.

In one embodiment, the TDT mobile app can also provide a notification of a missed threshold time based on the original time limit information received from the server computer and localized tracking of the remaining time for each package being transported by the operator. With this implementation, all of the threshold times are locally monitored, and the notifications can be locally generated. Failure of the operator to deliver the package to the intended recipient (i.e., complete the delivery) within the time limit can then be locally detected and communicated to the SM server or shipper computer from the operator MCD. The TDT mobile app can also generate the appropriate local messages for the operator to respond to the occurring failure condition. The operator MCD may then present options for the operator to manually respond to the notification or to request or triggering remote assistance or support to address/correct the time delay or the potential problem with the TTS package. The latter selection may occur because the operator is not able to immediately access the container, is having mechanical problems with his tractor, or other situation that prevents the operator from being able to appropriately respond to the occurring failure to meet the pending time limit. In one embodiment, the operator MCD is an electronic logging device programmed with executable code to perform the time limit tracking features.

As further described herein, implementation of the functional features of the disclosure described herein can involve use of a combination of hardware, firmware, as well as several software-level constructs (e.g., program code and/or program instructions and/or pseudo-code) that execute to provide a series of methods that present the different features and functions of the disclosure.

In the above description, exemplary embodiments in which various aspects of the disclosure may be practiced are described in general detail to enable those skilled in the art to practice the invention. It is to be understood that other embodiments may be utilized, and that logical, architectural, programmatic, mechanical, electrical and other changes may be made without departing from the spirit or scope of the present disclosure. The above description is an extended summary and therefore, should not to be taken in a limiting sense, and the scope of the present disclosure will be defined by appended claims and equivalents thereof. Other aspects of the disclosure that stem from and/or are extensions of the above-described processes are presented generally within the aforementioned descriptions and/or the figures accompanying this submission. Nothing within the present descriptions is to be taken as limiting on the scope of the greater application of the disclosure within the shipping and transportation industry/space or more general perishable product space.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the invention not be limited to the particular embodiments disclosed for carrying out the disclosure, but that the disclosure will include all embodiments falling within the scope of any appended claims. Moreover, the use of the terms first, second, etc. do not denote any order or importance, but rather the terms first, second, etc. are used to distinguish one element from another.

What is claimed is:

1. A method for facilitating on-time delivery of a temperature and time sensitive (TTS) shipment, the method comprising:
   receiving, by a processor of a computing device, entry of TTS shipping data, including a selection for delivery time tracking of a TTS package;
   receiving an entry providing an identification of a location tracker that is collocated with the TTS package, the location tracker enabling the TTS package to be geographically tracked during shipping;
   receiving entry of a total time limit for package delivery from a current time;
   assigning, relative to the total time limit for delivery of the TTS package, at least one threshold time that precedes the total time limit and at which one or more notifications are presented to indicate that an elapsed time has exceeded a specific threshold of the at least one threshold time;
   automatically initiating a tracking of the elapsed time from a time of packaging an item within the TTS package;
   receiving, via a network connection to the location tracker, an update of a real-time location of the TTS package relative to an intended destination;
   comparing the elapsed time with at least one threshold time that precedes the total time limit;
   in response to the elapsed time surpassing one threshold of the at least one threshold time, generating and forwarding a notification to an output device that includes an indication of a current elapsed time relative to the total time limit and a pre-configured notification message related to the time and/or temperature sensitivity of the TTS package;
   in response to a current time being past a threshold time associated with the TTS package delivery: generating a second notification indicating that a delivery time of the TTS package is over the threshold time; and transmitting, to an operator mobile communication device (MCD), a notification signal that triggers a local TTS application of the operator MCD to output an indication to the operator that the delivery time for the TTS package has reached the threshold time, the notification signal triggering the local TTS application on the operator MCD to activate/wake-up when the operator MCD is in a sleep or low power mode;
   generating an operator ranking and assigning the operator ranking based on a historical tracking of a success rate of an associated operator with getting TTS packages to the intended destination within the time limit; and
   autonomously selecting an operator to assigned to transport a new TTS package based on the operator ranking.

2. The method of claim 1, further comprising:
   determining a value of the at least one threshold time based on stored historical data by performing an empirical evaluation of previous shipments of similar packages as the TTS package.

3. The method of claim 1, further comprising:
   dynamically generating a work-flow for shipment of the TTS package;
   presenting a user interface (UI) entry for receiving a selection of a sensitivity level to apply to the TTS package;
   applying the sensitivity level received within the UI entry to the tracking of the elapsed time;
   outputting a time remaining notification to a shipment tracking UI presented on an output device; and outputting a corresponding notification when the sensitivity level is reached.

4. The method of claim 1, wherein the TTS shipment is a temperature-controlled packaging (TCP) shipment, the method further comprising identifying a time remaining for delivery of the TCP shipment in part based on a type and time-rating of the TCP.

5. The method of claim 1, further comprising:
presenting a TTS shipment identifier on a shipment tracking UI that presents a graphical representation of movement of one or more shipments within a geographical area; and
in response to detection of a selection of the shipment identifier in the shipment tracking UI, associating and presenting shipment specific details associated with the TTS package, including a TTS time limit and one or more threshold times and a length of time remaining before the TTS time limit expires or the at least one threshold time is passed.

6. The method of claim 1, further comprising:
periodically updating a remaining time to delivery based on the time limit and elapsed time from an initial start time; and
transmitting, to an operator mobile communication device (MCD), a time remaining notification and the at least one threshold time, along with identifying characteristics of the TTS package, including a locally unique identifier (ID) of the TTS package and a type of packaging.

7. The method of claim 1, further comprising:
incorporating, within the notification, additional information provided to the operator to have the operator take corrective actions to further protect and/or extend the shipping time of the TTS package.

8. The method of claim 1, further comprising:
assigning a risk level to the TTS package relative to other TTS packages being shipped and tracked;
automatically changing a list location of a visual representation of a TTS shipment identifier relative to other shipments within a UI, based on a current risk level of the TTS package;
tracking and recording a length of time the TTS package is placed in an elevated/high level status; and
generating elevated status notifications and communicating specific corrective actions based on a severity associated with that length of time.

9. A computer system comprising:
a memory in which is stored at least one elapsed-time-tracking and notification (ETTN) application for time and temperature sensitive (TTS) shipments;
at least one input/output device for receiving user input;
a network interface device enabling the computer system to communicatively connect via one or more networks to a plurality of external devices, including a location tracking sensor and an operator mobile communication device (MCD); and
a processor communicatively coupled to the memory and the network interface device and that processes program instructions of the ETTN application, which configures the computer system to:
  receive, by a processor of a computing device, entry of TTS shipping data, including a selection for delivery time tracking of a TTS package;
  receive an entry providing an identification of a location tracker that is collocated with the TTS package, the location tracker enabling the TTS package to be geographically tracked during shipping;
  receive entry of a total time limit for package delivery from a current time;
  assign, relative to the total time limit for delivery of the TTS package, at least one threshold time that precedes the total time limit and at which one or more notifications are presented to indicate that an elapsed time has exceeded a specific threshold of the at least one threshold time;
  automatically initiate a tracking of the elapsed time from a time of packaging an item within the TTS package;
  receive, via a network connection to the location tracker, an update of a real-time location of the TTS package relative to an intended destination;
  compare the elapsed time with at least one threshold time that precedes the total time limit;
  in response to the elapsed time surpassing one threshold of the at least one threshold time, generate and forward a notification to an output device that includes an indication of a current elapsed time relative to the total time limit and a pre-configured notification message related to the time and/or temperature sensitivity of the TTS package;
  in response to a current time being past a threshold time associated with the TTS package delivery: generate a second notification indicating that a delivery time of the TTS package is over the threshold time; and transmit, to an operator mobile communication device (MCD), a notification signal that triggers a local TTS application of the operator MCD to output an indication to the operator that the delivery time for the TTS package has reached the threshold time, the notification signal triggering the local TTS application on the operator MCD to activate/wake-up when the operator MCD is in a sleep or low power mode;
  generate an operator ranking and assigning the operator ranking based on a historical tracking of a success rate of an associated operator with getting TTS packages to the intended destination within the time limit; and
  autonomously select an operator to assigned to transport a new TTS package based on the operator ranking.

10. A mobile communication device (MCD) comprising:
a memory having stored thereon a timed delivery tracking (TDT) mobile app for tracking remaining delivery time for a time and temperature sensitive (TTS) package being transported by an operator;
input/output (I/O) devices comprising at least one input device and at least one output device, including a display screen;
a wireless connection subsystem that enables the MCD to wirelessly communicate with one or more second devices via one or more wireless networks; and
a processor communicatively coupled to the memory and the wireless connection subsystem, the processor processing program code of the TDT mobile app and configuring the MCD to:
link, via the wireless connection subsystem, to a transmitter placed on a TTS package;
communicatively connect, via the wireless connection subsystem through a wireless network to a shipment tracking server, which provides a remote monitoring system that provides background tracking of different TTS shipments, including the TTS package;

receive a delivery time and at least one threshold time from the shipment tracking server related to the delivery of the TTS package;

locally track an elapsed time and a remaining time for the TTS package being transported by the operator;

present, on the display screen, a user interface that tracks and reports, in real time, a time limit for delivery of the TTS package being transported by the operator, and the at least one threshold time;

in response to an elapse time extending beyond the at least one threshold, provide an output to notify the operator of a missed threshold time within a timeframe for completing the delivery of the TTS package; and receive, from the shipment tracking server via the wireless connection subsystem, a notification indicating that a delivery time of the TTS package is over the threshold time, wherein the notification is generated at the shipment tracking server in response to a current time being past a threshold time associated with the delivery of the TTS package, and wherein the shipment tracking server further: generates and assigns an operator ranking based on a historical tracking of a success rate of an associated operator with getting TTS packages to the intended destination within the time limit; and autonomously selects the operator to assigned to transport a new TTS package based on the operator ranking; and in response to receiving the notification signal, triggering the MCD to output an indication to the operator that the delivery time for the TTS package has reached the threshold time, the notification signal triggering a TTS application on the MCD to activate/wake-up when the MCD is in a sleep or low power mode.

11. The mobile communication device of claim 10, wherein the processor further configures the MCD to locally monitor an elapse time and a remaining time for delivery relative to each of the at least one threshold time.

12. The mobile communication device of claim 10, wherein the processor further configures the MCD to:
in response to the operator failing to complete delivery of the TTS package before the threshold time:
forward a notification of a failure to complete the delivery to the shipment tracking server;
generate one or more local notification messages for the operator to respond to the failure to complete the delivery within the time limit; and
present options for the operator to manually respond to the notification messages to address and/or correct a time delay or a potential problem with the TTS package.

13. The mobile communication device of claim 10, wherein the processor further configures the MCD to dynamically generate a work-flow for shipment of the TTS package; and output a time remaining notification to a shipment tracking user interface presented on an output device.

14. The mobile communication device of claim 10, wherein the processor further configures the MCD to receive, from the shipment tracking server, identifying characteristics of the TTS package, including a locally unique identifier (ID) of the TTS package and a type of packaging, and one or more time-remaining parameters, along with established time thresholds.

* * * * *